United States Patent
Ozturk

(10) Patent No.: US 10,057,838 B2
(45) Date of Patent: Aug. 21, 2018

(54) X2 SETUP AND ROUTING AT AN X2-GATEWAY

(71) Applicant: QUALCOMM Incorporated, San Diego, CA (US)

(72) Inventor: Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 14/261,388

(22) Filed: Apr. 24, 2014

(65) Prior Publication Data

US 2014/0321447 A1    Oct. 30, 2014

Related U.S. Application Data

(60) Provisional application No. 61/816,615, filed on Apr. 26, 2013.

(51) Int. Cl.
   *H04W 4/00*      (2009.01)
   *H04W 48/16*     (2009.01)
   (Continued)

(52) U.S. Cl.
   CPC .......... *H04W 48/16* (2013.01); *H04W 24/02* (2013.01); *H04W 60/00* (2013.01); *H04W 88/16* (2013.01); *H04W 92/20* (2013.01)

(58) Field of Classification Search
   USPC ................. 370/331, 338; 455/435.1, 404.2
   See application file for complete search history.

(56) References Cited

U.S. PATENT DOCUMENTS

| 7,328,009 B2 * | 2/2008 | Takeda ................. H04W 28/10 455/424 |
| 2003/0152063 A1 * | 8/2003 | Giese ...................... H04W 4/06 370/349 |

(Continued)

FOREIGN PATENT DOCUMENTS

| CN | 101827368 A | 9/2010 |
| CN | 102316604 A * | 9/2011 |
| WO | WO 2012/148217 A2 * | 11/2012 ............ H04W 92/20 |

OTHER PUBLICATIONS

U.S. Appl. No. 61/721,745, Gunnarsson et al, filed Nov. 2, 2012, pp. 1-17.*

(Continued)

*Primary Examiner* — Phuongchau Ba Nguyen
(74) *Attorney, Agent, or Firm* — Harrity & Harrity, LLP

(57) ABSTRACT

An access point may perform a method for X2 communication set up in a wireless communication network. The method may include discovering a neighbor node at an access point, optionally in response to detecting a new neighbor node, or an address parameter change at a neighbor node. The method may further include transmitting to an X2 gateway (X2-GW), a registration message comprising an address of the neighbor node for X2 communication. The registration message may include at least two addresses of the at least one neighbor node, the two addresses corresponding to addresses at a higher protocol layer and a lower protocol layer, for example a transport network layer (TNL) address and radio network layer (RNL) address of the at least one neighbor node. The access point may further receive an acknowledgement message from the X2-GW for the registration message.

30 Claims, 10 Drawing Sheets

(51) Int. Cl.
  *H04W 24/02* (2009.01)
  *H04W 92/20* (2009.01)
  *H04W 88/16* (2009.01)
  *H04W 60/00* (2009.01)

(56) References Cited

U.S. PATENT DOCUMENTS

| | | | | |
|---|---|---|---|---|
| 2003/0214925 | A1* | 11/2003 | Diaz Cervera | H04W 88/16 370/328 |
| 2006/0056351 | A1* | 3/2006 | Wall | H04W 80/04 370/389 |
| 2008/0076412 | A1* | 3/2008 | Khetawat | H04W 92/20 455/432.1 |
| 2008/0253382 | A1* | 10/2008 | Bachmann | H04W 80/04 370/400 |
| 2009/0109933 | A1* | 4/2009 | Murasawa | H04W 88/12 370/335 |
| 2009/0238115 | A1* | 9/2009 | Yamane | H04W 80/04 370/328 |
| 2010/0035617 | A1* | 2/2010 | Whinnett | H04W 88/182 455/422.1 |
| 2010/0074247 | A1* | 3/2010 | Clark | H04M 3/465 370/352 |
| 2010/0111040 | A1* | 5/2010 | Perras | H04W 36/14 370/331 |
| 2010/0322146 | A1* | 12/2010 | Liu | 370/315 |
| 2011/0237258 | A1* | 9/2011 | Nylander | H04W 84/045 455/437 |
| 2011/0286429 | A1* | 11/2011 | Vikberg | H04W 88/12 370/331 |
| 2012/0163177 | A1* | 6/2012 | Vaswani | H04W 28/10 370/236 |
| 2012/0182969 | A1* | 7/2012 | Takahashi | H04W 24/10 370/331 |
| 2012/0307795 | A1* | 12/2012 | Takahashi | H04W 36/0055 370/331 |
| 2013/0150021 | A1* | 6/2013 | Oh | H04W 88/16 455/422.1 |
| 2013/0176990 | A1* | 7/2013 | Xu | H04W 36/165 370/331 |
| 2014/0321447 | A1* | 10/2014 | Ozturk | H04W 48/16 370/338 |
| 2015/0017925 | A1* | 1/2015 | Schwarzbauer | H04W 24/02 455/67.11 |
| 2015/0065130 | A1* | 3/2015 | Inakoshi | H04W 60/06 455/435.2 |
| 2015/0124702 | A1* | 5/2015 | Ozturk | H04W 92/20 370/328 |
| 2015/0146619 | A1* | 5/2015 | Xu | H04W 92/20 455/422.1 |
| 2015/0296390 | A1* | 10/2015 | Mino Diaz | H04W 92/20 455/450 |
| 2016/0088470 | A1* | 3/2016 | Sivavakeesar | H04W 8/26 455/435.1 |

OTHER PUBLICATIONS

U.S. Appl. No. 61/753,856, Xu et al, filed Jan. 17, 2013, pp. 1-16.*
U.S. Appl. No. 61/765,812, Xu et al, filed Feb. 18, 2013, pp. 1-16.*
U.S. Appl. No. 61/721,512, Xu et al, filed Nov. 2, 2012, pp. 1-24.*
Alcatel-Lucent: "Way Forward on IP address discovery and X2 Setup", 3GPP DRAFT, R3-130381, PROXYWAYFRWDSETUP, 3rd Generation Partnership Project (3GPP), Mobile Competence Centre, 650, Route Des Lucioles, F-06921 Sophia-Antipolis Cedex, France, vol. RAN WG3, no. Malta, 20130128-20130201, Feb. 4, 2013 (Feb. 4, 2013), XP050671228, 2 pages. Retrieved from the Internet: URL:http://www.3gpp.org/ftp/tsg_ran/WG3_lu/TSGR3_79/Docs/.
Ericsson: "Selecting a Suitable Option for the X2-GW", 3GPP DRAFT; R3-130720, 3rd Generation Partnership Project (3GPP), Mobile Competence Centre, 650, Route Des Lucioles, F-06921 Sophia-Antipolis Cedex, France, vol. RAN WG3, no. Chicago, USA, 20130415-20130419, Apr. 6, 2013 (Apr. 6, 2013), XP050700712, 6 pages. Retrieved from the Internet: URL:http://www.3gpp.org/ftp/tsg_ran/WG3_lu/TSGR3_79bis/Docs/.
International Search Report and Written Opinion—PCT/US2014/035570—ISA/EPO—Oct. 21, 2014.
Qualcomm Incorporated: "Discovery of peer nodes with X2-GW Deployment", 3GPP DRAFT, R3-130215 X2GW Discovery, 3rd Generation Partnership Project (3GPP), Mobile Competence Centre, 650, Route Des Lucioles, F-06921 Sophia-Antipolis Cedex, France, vol. RAN WG3, no. Malta, 20130128-20130201, Jan. 19, 2013 (Jan. 19, 2013), XP050671031, 4 pages. Retrieved from the Internet: URL:http://www.3gpp.org/ftp/tsg_ran/WG3_lu/TSGR3_79/Docs/.
Qualcomm Incorporated: "X2 setup procedure via X2-GW", 3GPP DRAFT, R3-130216 X2 Setup, 3rd Generation Partnership Project (3GPP), Mobile Competence Centre, 650, Route Des Lucioles, F-06921 Sophia-Antipolis Cedex, France vol. RAN WG3, no. Malta, 20130128-20130201, Jan. 19, 2013 (Jan. 19, 2013), XP050671032, 2 pages. Retrieved from the Internet: URL:http://www.3gpp.org/ftpjtsg_ran/WG3_lu/TSGR3_79/Docs/.
ZTE: "Issues on X2-GW Deployment", 3GPP DRAFT, R3-130571, 3rd Generation Partnership Project (3GPP), Mobile Competence Centre, 650, Route Des Lucioles, F-06921, Sophia-Antipolis Cedex, France, vol. RAN WG3. no. Chicago, USA, 20130415-20130419, Apr. 1 3, 2013 (Apr. 3, 2013), XP050700448, 6 pages. Retrieved from the Internet: URL:http://www.3gpp.orgjftpjtsg_ran/WG3_lu/TSGR3 79bis/Docs/.

* cited by examiner

X2 SETUP AND ROUTING AT AN X2-GATEWAY

CROSS-REFERENCE TO RELATED APPLICATION

The present application claims priority under 35 U.S.C. §119(e) to U.S. provisional application Ser. No. 61/816,615 filed Apr. 26, 2013, which application is incorporated by reference herein, in its entirety.

FIELD

The present disclosure relates to communication systems and to techniques for setup and routing at an X2-gateway (X2-GW).

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, or other terminology.

SUMMARY

Methods, apparatus and systems for setup and routing at an X2-gateway in a wireless communications system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A method for X2 set up and routing at an X2-GW by an access point may include, an access point discovering at least one neighbor node. Discovering may include requesting, or otherwise obtaining, address information from each neighbor node detected by the access point. The address information may include at least two addresses of the at least one neighbor node, the two addresses corresponding to addresses at a higher protocol layer and a lower protocol layer. For example, the at last two addresses may include a transport network layer (TNL) address and radio network layer (RNL) address of the at least one neighbor node. The method may further include, transmitting, from the access point to an X2-GW, a registration message comprising at least one address of the at least one neighbor node for X2 communication. The method may further include receiving an acknowledgement message from the X2-GW in response to the registration message. The access point may be, or may include, at least one of an HeNB or other small cell, or an eNB. Likewise, the at least one neighbor node may be, or may include, at least one of a HeNB or other small cell, or an eNB.

In an aspect, the X2-GW may receive similar registration messages from several access points, and aggregate the address information in the registration messages into a data table or other data structure. The data table or structure may relate the higher and lower layer addresses to each other, as in a routing map or table. For example, a data table maintained by the X2-GM in response to registration messages may relate a TNL address to an RNL address, for each access point serviced by the X2-GW. Thus, the X2-GW may use the data table to route X2 messages between the access points that it services, including both macro cells and small cells.

In another aspect of the method by the access point, the access point may generate the registration message comprising at least two addresses of the at least one neighbor node, the two addresses corresponding to addresses at a higher protocol layer and a lower protocol layer. For example, as noted above, the at least two addresses may comprise a TNL address and RNL address of the at least one neighbor node.

In another aspect of the method, the access point may initiate the discovering in response to at least one of detection of at least one new neighbor node, or an address parameter change at the at least one neighbor node. Accordingly, the access point may then transmit another registration message to the X2-GW, comprising at least one updated address in response to detecting the parameter change. The X2-GW may use such messages with updated address information to maintain its routing table in current condition.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as an access point (small cell or macro cell) of a wireless communication network, or in an X2-GW routing messages between access points. Similarly, an article of manufacture may be provided, including a computer-readable storage medium holding encoded instructions, which when executed by a processor, cause a network entity to perform the methods and aspects of the methods as summarized above.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. The cdma2000 radio technology covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
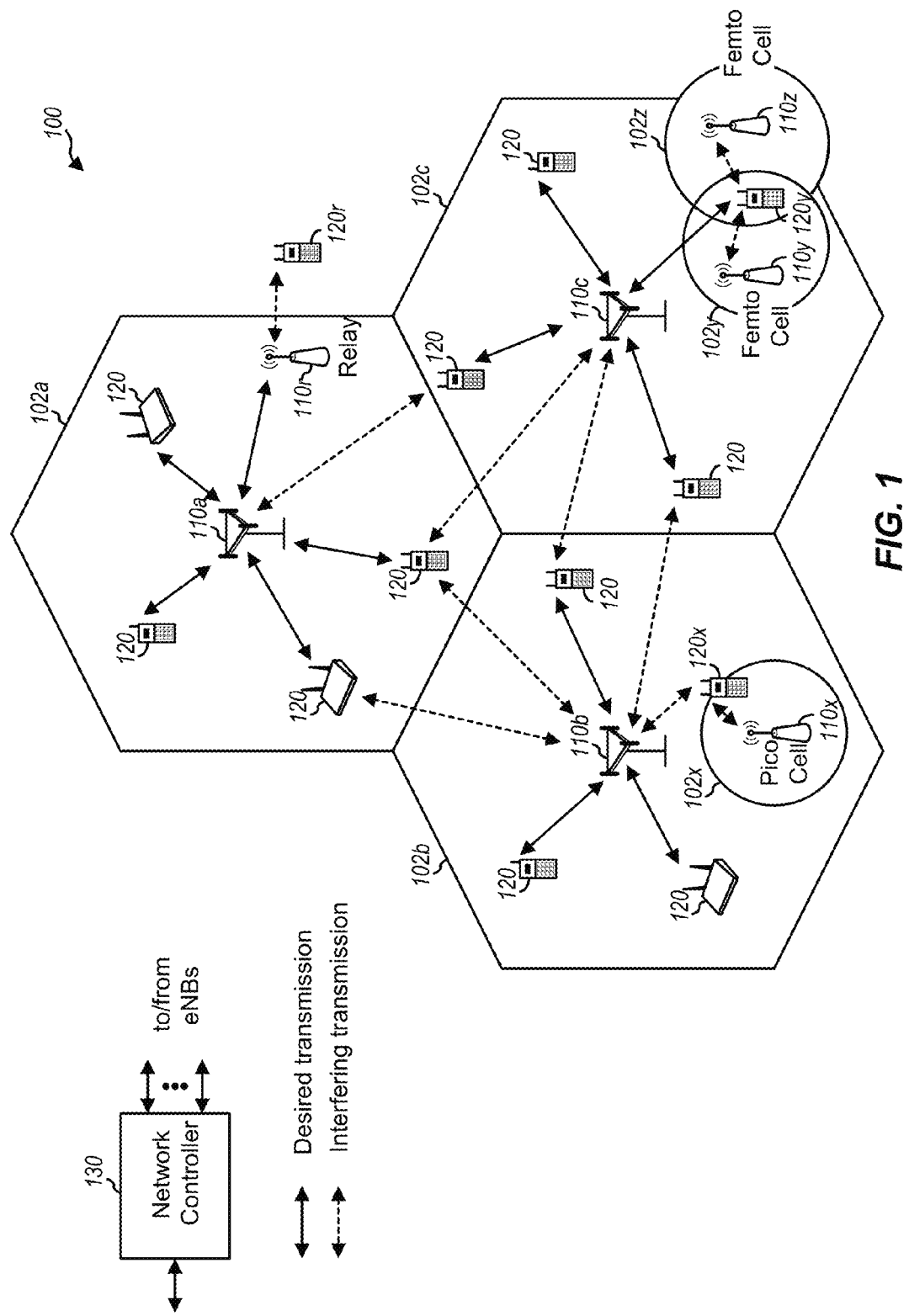
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

Femto cells and pico cells are examples of small cells. As used herein, a small cell means a cell characterized by having a transmit power substantially less than each macro cell in the network with the small cell, for example low-power access nodes such as defined in 3GPP Technical Report (T.R.) 36.932 V12.1.0, Section 4 ("Introduction").

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, or other terminology.

The wireless network 100 may be a heterogeneous network that includes eNBs of different types, e.g., macro eNBs, pico eNBs, femto eNBs, relays, or other types. These different types of eNBs may have different transmit power levels, different coverage areas, and different impact on interference in the wireless network 100. For example, macro eNBs may have a high transmit power level (e.g., 20 Watts) whereas small cell eNBs such as pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a notepad computer, a notebook computer, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
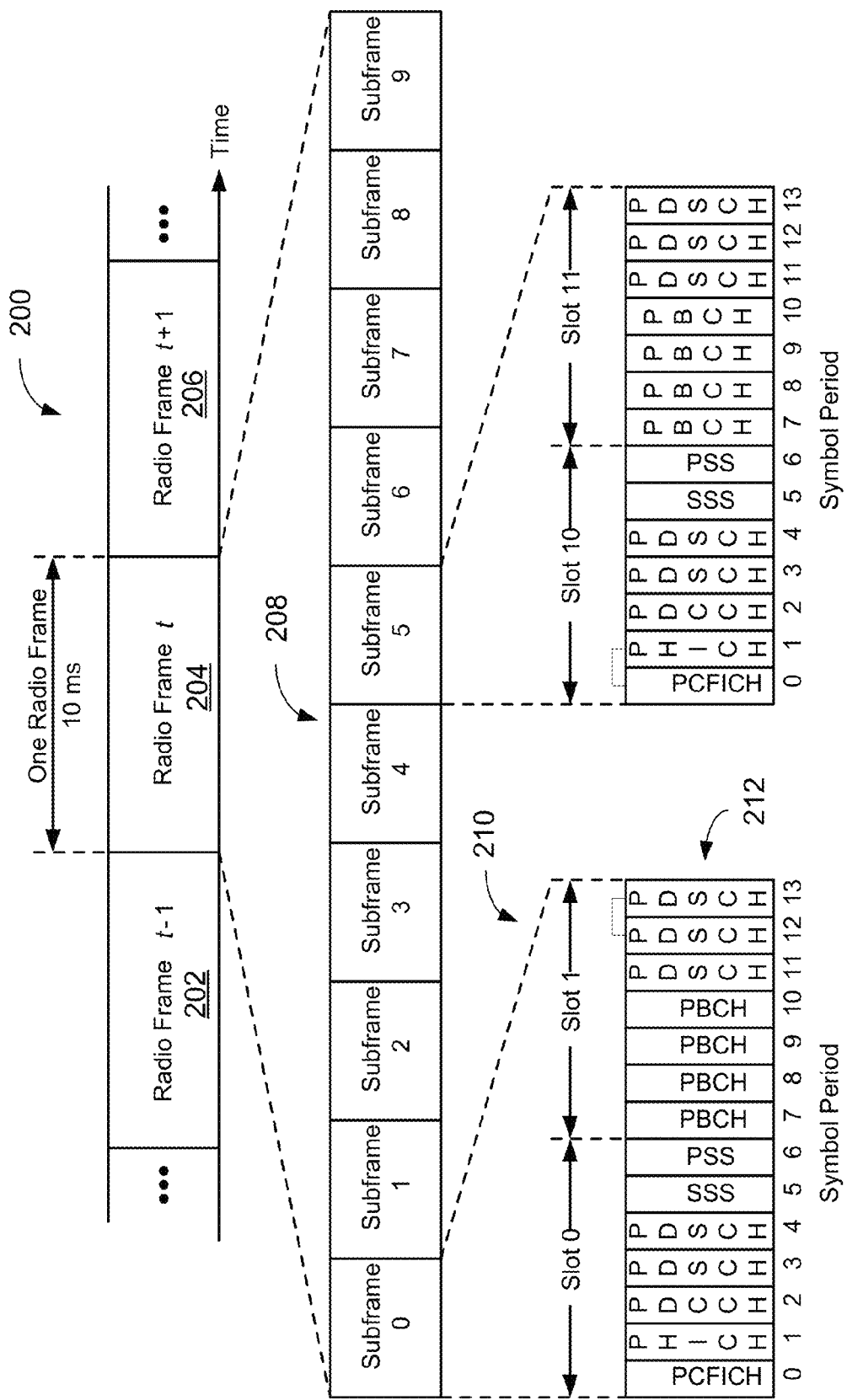
FIG. 2 is a block diagram conceptually illustrating an example of a down link frame structure in a telecommunications system.
Figure 6:
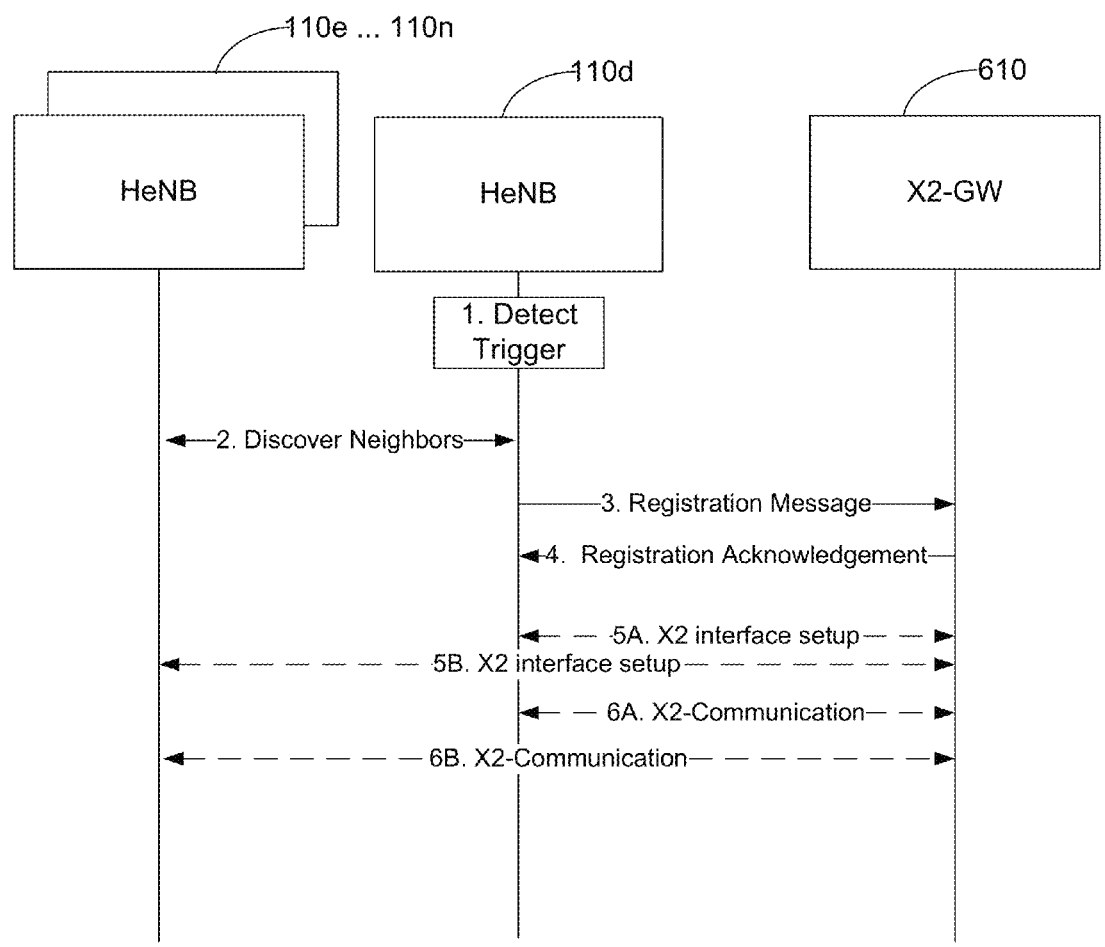
FIG. 6 is a call flow diagram illustrating X2 communication including registration by an HeNB.

FIG. 2 shows a down link frame structure used in LTE. The transmission timeline for the downlink may be partitioned into units of radio frames. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
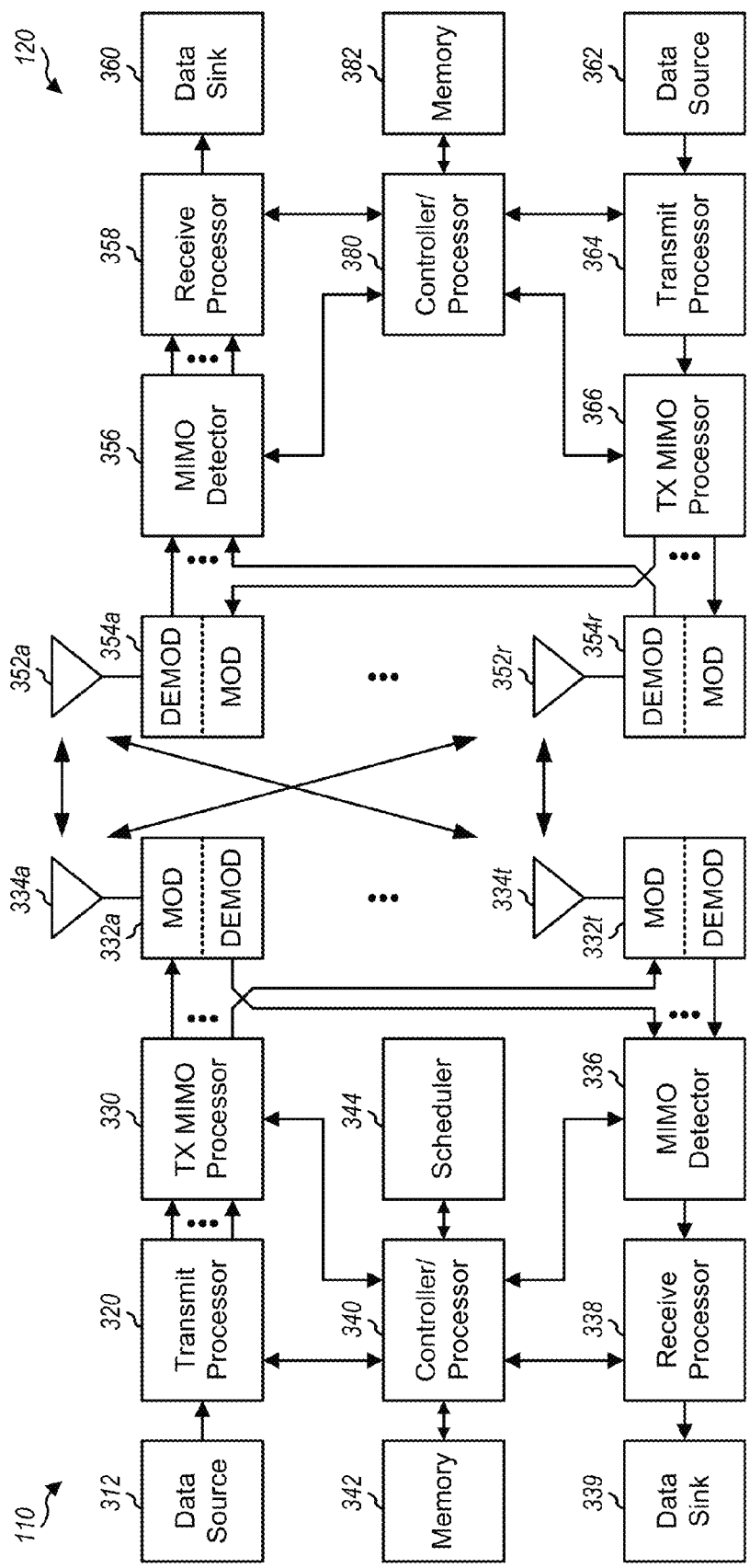
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 340 and/or other processors and modules at the base station 110 may also perform or direct the execution of the functional blocks illustrated in FIGS. 7 and 8, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
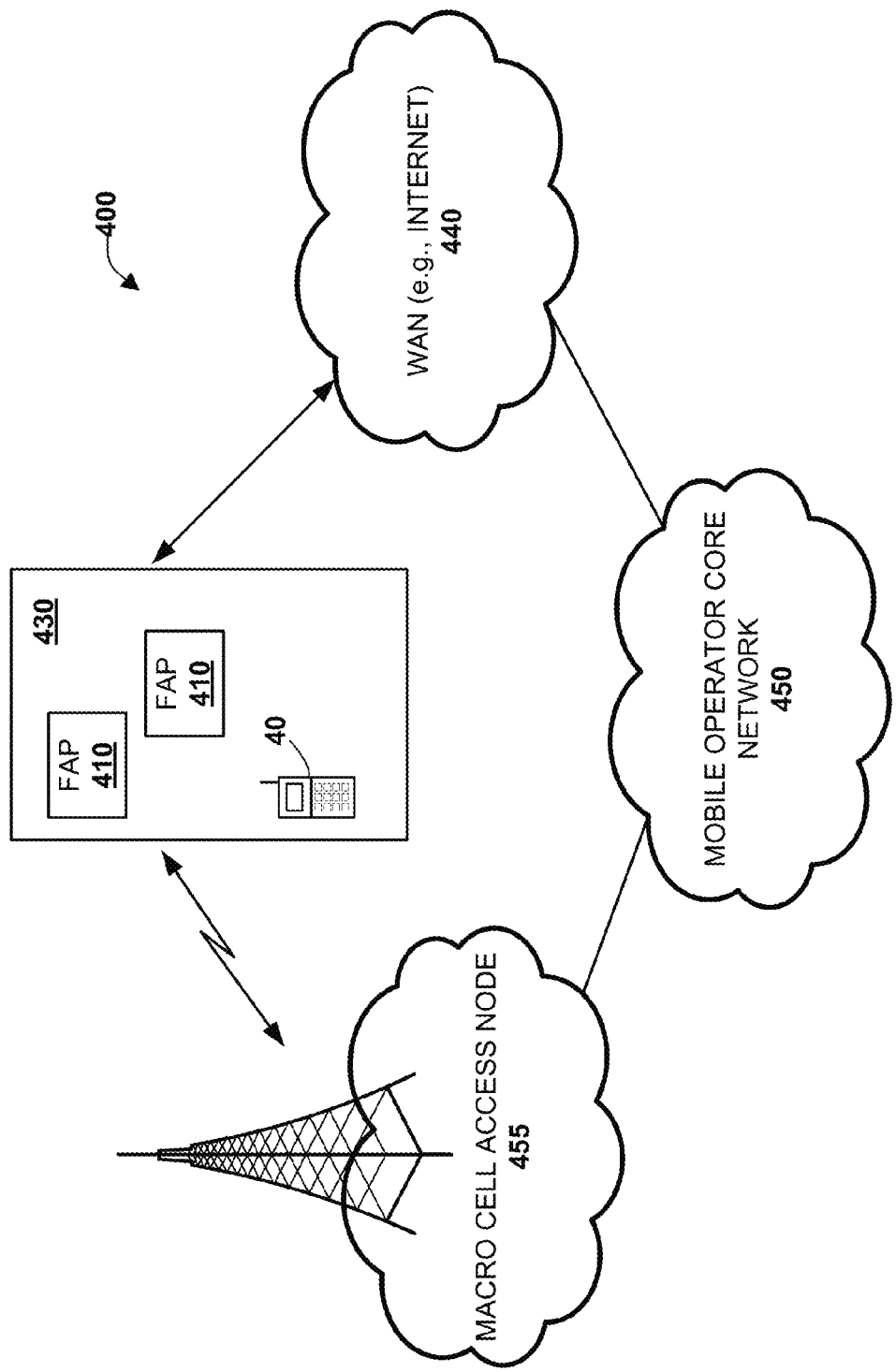
FIG. 4 is a block diagram illustrating another example communication system.

FIG. 4 is an illustration of a planned or semi-planned wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1xRTT, 1xEV-DO Rel0, RevA, RevB), and other known and related technologies.

Figure 5:
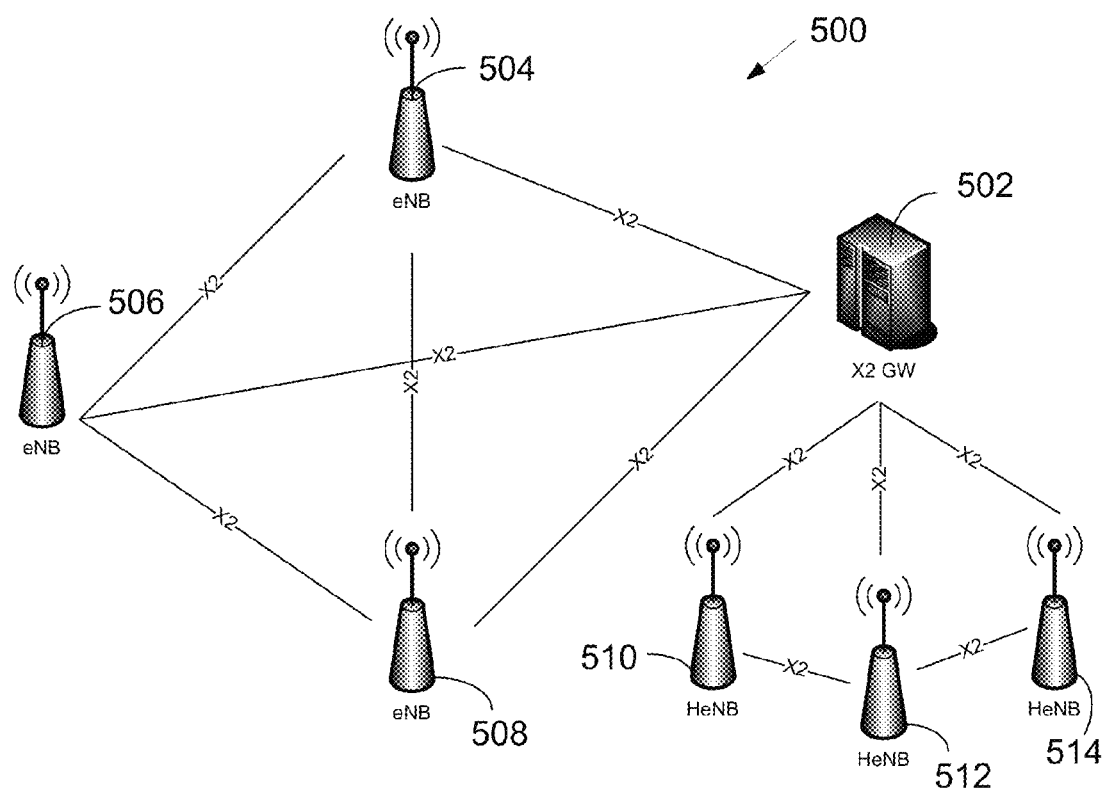
FIG. 5 is a block diagram of yet another example communication system.

FIG. 5 is a block diagram of yet another example communication system, describing the X2-Gateway (X2-GW) reference architecture. The X2 interface may be used for direct communication between eNBs and HeNBs. FIG. 5 shows the X2-GW coupled to eNBs and HeNBs via the X2 interface. As illustrated in FIG. 5, the eNBs/HeNBs may be connected to eNBs/HeNBs via direct X2 interfaces or via X2 interfaces by way of the X2-GW. With the addition of the X2-GW, the X2 interface may be modified to enable the X2-GW functions as follows. The HeNB and eNB may connect to the X2-GW using existing X2 setup and reset procedures. The HeNBs and eNBs route X2 messages to the X2-GW, e.g., based on eNB identifier (ID), Tracking Area Identifier (TAI), E-UTRAN Cell Global Identifier (e-CGI), Closed Subscriber Group Identifier (CSG ID), or other identifier. Thus, there may be no need to exchange eNB configuration between the eNBs, and the cells behind the X2-GW may be hidden from the source eNB. X2 messages from an eNB to another eNB may be routed at the X2-GW based on the eNB ID or cell ID. For example, the target eNB ID may need to be added to the X2 message to enable simple routing by the X2-GW. An error message from the X2 GW may be defined for the case where the X2-GW does not support the eNB ID/cell ID for a received message.

X2-GW may exist in 3GPP to help enable X2 connection between HeNBs and eNBs. The X2-GW may act as a proxy between peer nodes such that it may facilitate X2 setup and route other X2 application protocol (X2AP) connections. One issues relates to how the X2-GW may determine an address, such as a transport network layer (TNL) address for example an Internet Protocol (IP) address, of a target node for sending the received X2AP messages from a node. These messages may include the X2 setup messages and subsequent messages following the X2 setup.

One solution may be to include the TNL address of the target in every X2AP message. For example, a node (e.g., HeNB) may include the TNL address in every message transmitted to another node. However, this solution may have drawbacks since the X2 messages are at the RNL (radio network layer), separate and distinct from the TNL. For example, including the TNL address (a lower layer address) for an RNL (a higher layer address) message may violate the layer protocol. Therefore, a better solution may be to include an RNL identification such as a Cell ID or an equivalent in the X2AP messages. This solution may include the X2-GW using the RNL ID to find the target TNL address for forwarding. Therefore, the X2-GW may need to know the mapping between the RNL ID(s) and TNL address(es) for an eNB, and the X2-GW may need to keep a routing table with this mapping.

The X2-GW may form this routing table if it possesses the RNL ID and TNL addresses for all the eNBs which may connect through it. One method for providing this information may be for a HeNB or eNB to send a special message to the X2-GW to inform about cell identification parameters of the HeNB or eNB before attempting any communication with another HeNB through the X2-GW. This special message may be called a "registration" in this disclosure, and the registration message may include TNL or IP address(es) of the source eNB as well as other information including the same information for some or all of the neighbor nodes of the HeNB.

It may be feasible for an HeNB to perform registration since the HeNB may be configured with the address of a unique X2-GW the HeNB is connected to. However, a similar procedure for an eNB that is already deployed may be less feasible, because since a corresponding procedure by the eNB may require new configuration at the eNB with the IP addresses of all the X2-GWs which are connected to neighbor HeNBs of the eNB, and the eNB may need to perform the registration with all of the X2-GWs. An alternative approach, proposed here, may be for the HeNB to perform an extended registration such that the registration includes the cell parameters and one or more IP addresses of all the eNBs discovered by the HeNB. In this way, the configuration at the eNB may be eliminated, and the HeNB may perform registration for both itself and neighbor eNBs.

The registration message may be constructed in several ways. In one aspect, an already existing X2 message may be modified and extended so that X2-GW may interpret it as a registration. For example, if the target routing information (such as the RNL ID) is missing in a message, the X2-GW may interpret the message as a registration message. In another aspect, a new X2 message may be defined which is specifically used for the purpose of registration. In both cases, the message may include the RNL and TNL addresses of the HeNB and neighbor HeNBs.

The HeNB may register with the X2-GW when necessary so that the X2-GW obtains information, including the TNL and RNL IDs and other parameters which may be used for routing messages to and from this HeNB. The registration event instances, or triggers for initiating registration by the HeNB, may include turning on (or power on of the HeNB), a change in cell parameters and address(es) of the HeNB, or updates for similar parameters for the HeNB's neighbor cells and eNBs which may have been discovered through, for example, ANR and configuration. In the registration process, the HeNB may include all the relevant information which the X2-GW may use for routing of X2 messages. The information may include the HeNB's own IP address(es), which may also be derived from the message itself if the HeNB only uses one IP address for all external communications, and the RNL and TNL addresses of all the neighbor eNBs that the HeNB wants to inform the X2-GW about. The HeNB may learn an IP address of each such neighbors using the TNL Discovery procedure already supported in 3GPP. The HeNB may send an updated registration when any of the parameters change, for example, when the HeNB discovers a new eNB neighbor.

Advantages of the above method may include that the X2-GW may learn the routing information necessary for communication between HeNBs and eNBs through an X2-GW from the HeNB, and the eNB may not need to perform any registration. Without this approach, the eNB may need to register with all the X2-GWs which are connected to the eNB's neighbor HeNBs. Otherwise, an HeNB may not be able to set up a communication (e.g., X2 setup) with an eNB since the X2-GW may not be aware of the addresses of the target eNB. This approach may provide the registration of the eNB to be done by the HeNB where this information is provided to the X2-GW.

FIG. 6 is a call flow diagram illustrating X2 communication including registration by an HeNB. An example communication system may include one or more HeNBs 110d, 110e . . . 110n, and an X2-GW 610. A registration process may provide information to an X2-GW to route messages between HeNBs. For example, the registration process may provide the X2-GW with RNL IDs, TNL addresses, IP addresses, or similar address information. The registration process may be initiated by an HeNB.

In the example of FIG. 6, the process may begin at step 1, with an HeNB 110d detecting a trigger to perform the registration process. For example, the trigger may be a power on of the HeNB 110d, a change in a cell parameters and address(es) of the HeNB 110d, or updates for similar parameters for the HeNB's neighbor cells 110e . . . 110n. At step 2, the HeNB may discover neighbor nodes 110e . . . 100n. The HeNB 110d may receive information for the neighbor nodes 110e . . . 100n, e.g., through ANR, etc. At step 3, the HeNB 110d may transmit a registration message to an X2-GW 610. The registration message may include information for the HeNB 110d and neighbor nodes 110e . . . 110n. The registration message may be an existing X2 message or a new message for registration. The information may be used by the X2-GW for routing X2 messages. For example, the registration message may include RNL and TNL addresses. The X2-GW may create a mapping between RNL and TNL addresses, e.g., via a look-up table, hash table, or other data structure. At step 4, the X2-GW may send a registration acknowledgement message in response to the registration. At steps 5 A-B, the HeNB 110*d* may perform X2 setup to establish an X2 interface through the X2-GW. At steps 6A-B, the HeNB 110*d* may initiate communication with a neighbor node via X2 communication. The X2-GW may route messages between the HeNB 110*d* and neighbor node (e.g., one of HeNB 110*e* . . . 110*n*) based on the information provided by the registration message and other routing information in the messages themselves.

In an example, HeNB 110*d* is powered on at step 1. The power on event triggers the HeNB 110*d* to perform the registration process. The HeNB 110*d* discovers and collects neighbor node information prior to transmitting a registration message to an X2-GW. The HeNB 110*d* discovers two neighbor nodes 110*e*, 100*f*. The HeNB 110*d* receives the RNL and TNL addresses of neighbor nodes 110*e*, 100*f* in connection with the discover step 2. At step 3, HeNB 110*d* formats a registration message to the X2-GW. The registration message includes the RNL and TNL addresses of HeNB 110*d*, and the neighbor nodes 110*e*, 100*f*. HeNB 110*d* transmits the registration message to the X2-GW 610 in step 3. The X2-GW receives the registration message and acknowledges receipt of the registration message in step 4. The X2-GW creates mapping between the RNL addresses and TNL addresses of the HeNBs 110*d*, 110*e*, 110*f*. The X2-GW transmits an acknowledgment message to the HeNB 110*d* in step 4. After the HeNB 110*d* receives the registration acknowledgement, the HeNB 110*d* sets up the X2 interface at steps 5A-B. The HeNB 110*d* desires to transmit a message to neighbor node 110*e* at step 6A-B. In step 6A, HeNB 110*d* transmits a message to neighbor node 110*e* via the X2-GW. The message includes an RNL address of neighbor node 110*e*. The X2-GW looks up the TNL address of node 110*e*. The X2-GW finds the TNL address of neighbor node 110*e* and routes the message to node 110*e*, at step 6B.

Figure 7:
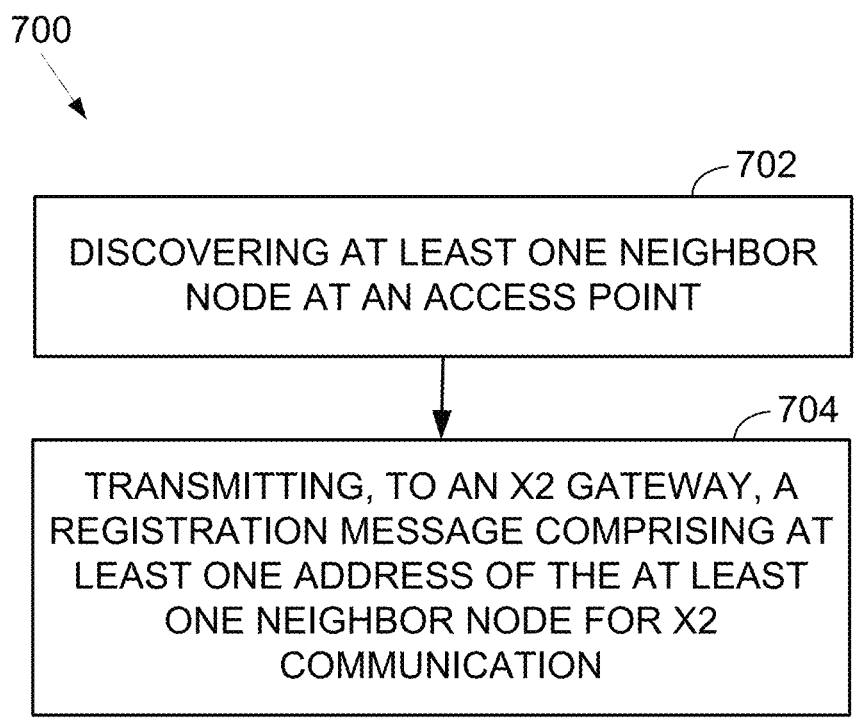
FIG. 7-9 illustrate an exemplary methodology for X2 setup and routing at an X2-Gateway, and aspects thereof.

In accordance with one or more aspects of the embodiments described herein, with reference to FIG. 7, there is shown a methodology 700, operable by a network entity, such as, for example, an HeNB, a femtocell, a picocell, or other small cell, or by a macrocell. Specifically, method 700 describes a procedure for X2 set up and routing at an X2-GW. The method 700 may include, at 702, discovering at least one neighbor node at an access point. For example, the access point may use a 3GPP discovery procedure. The discovery may include requesting, or otherwise obtaining, address information from each detected neighbor node. The address information may include at least two addresses of the at least one neighbor node, the two addresses corresponding to addresses at a higher protocol layer and a lower protocol layer. For example, the at last two addresses may include a transport network layer (TNL) address and radio network layer (RNL) address of the at least one neighbor node. The method 700 may further include, at 704, transmitting, to an X2-GW, a registration message comprising at least one address of the at least one neighbor node for X2 communication. The method 700 may further include receiving an acknowledgement message from the X2-GW in response to the registration message. The access point may be, or may include, at least one of an HeNB or eNB. Likewise, the at least one neighbor node may be, or may include, at least one of a HeNB or eNB.

In an aspect, the X2-GW may receive similar registration messages from several access points, and aggregate the address information in the registration messages into a data table or other data structure. The data table or structure may relate the higher and lower layer addresses to each other, as in a routing map or table. For example, a data table maintained by the X2-GM in response to registration messages may relate a TNL address to an RNL address, for each access point serviced by the X2-GW. Thus, the X2-GW may use the data table to route X2 messages between the access points that it services, including both macro cells and small cells.

Figure 8:
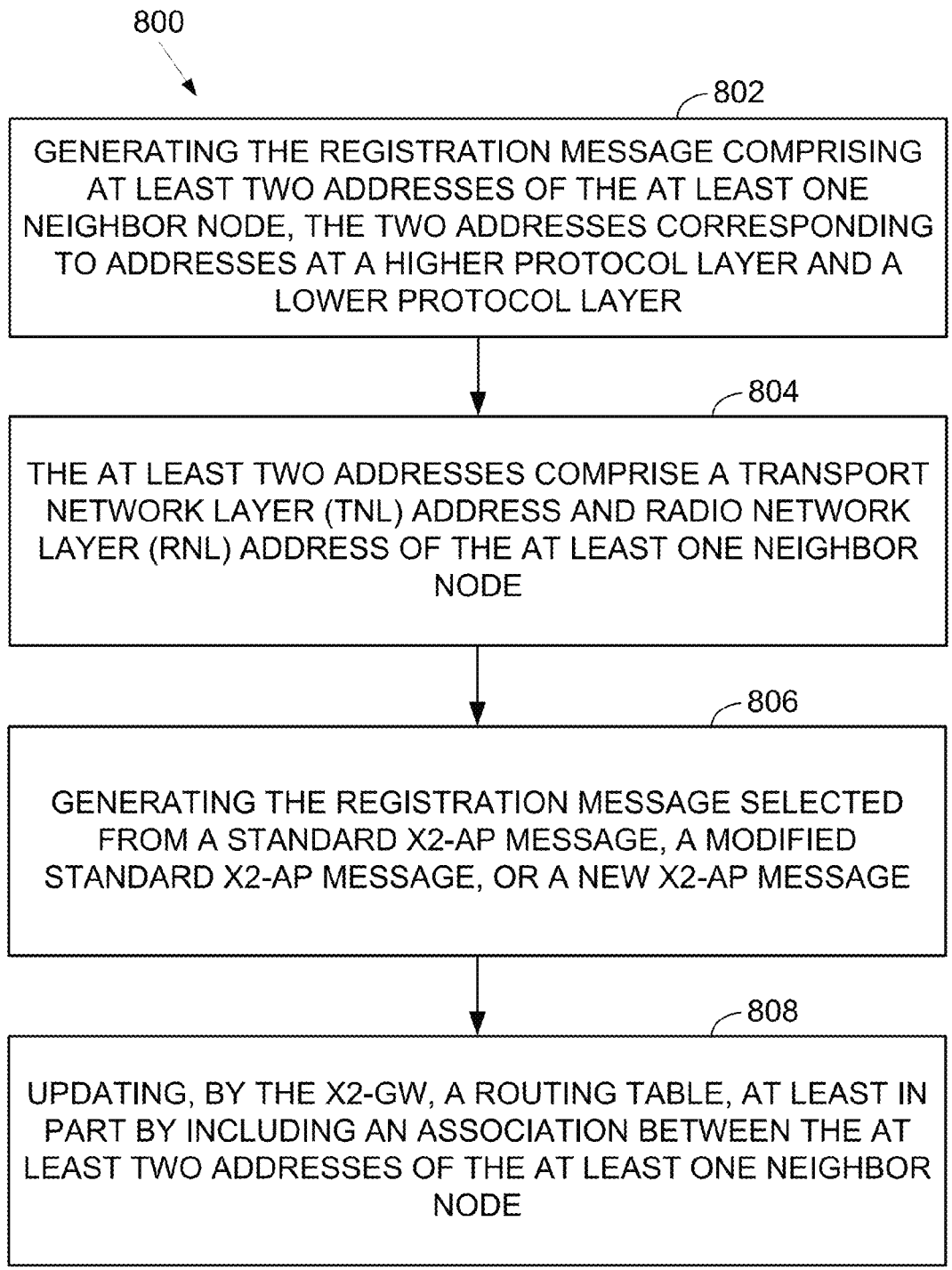
Figure 9:
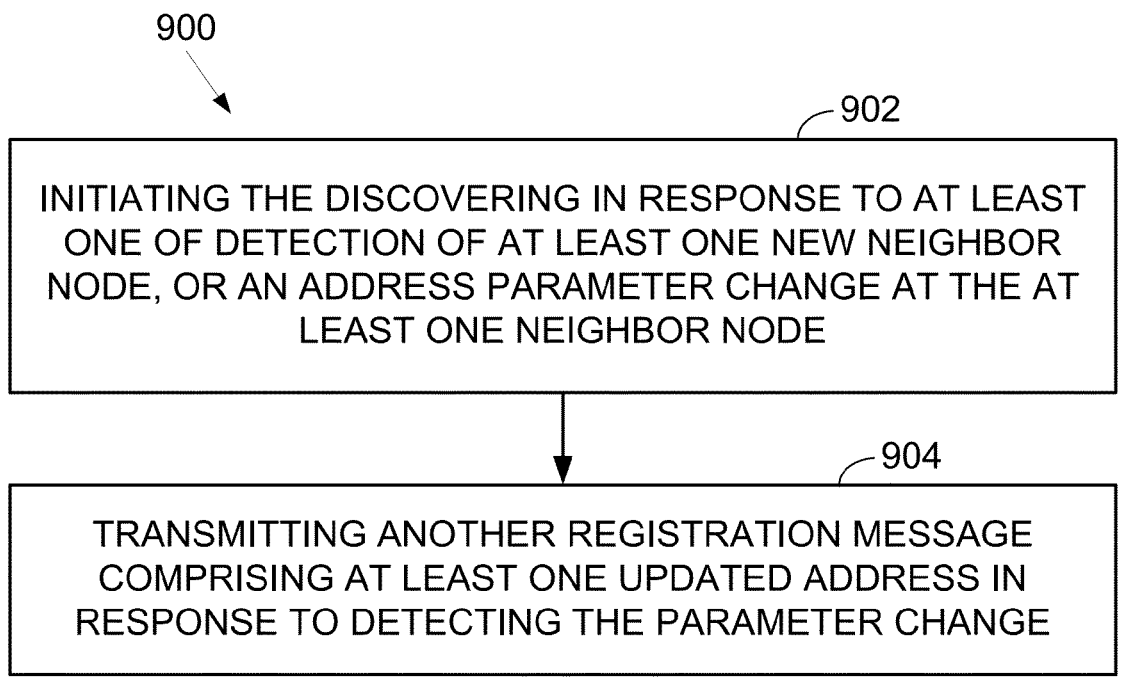

The method 700 may further include additional operations or aspects, for example, one or more of operations 800 or 900 illustrated in FIGS. 8-9. Any one of these operations may be included as part of method 700, without necessarily requiring other upstream or downstream operations to also be included. Operations are grouped into different figures merely for illustrative convenience, and useful applications of the concepts disclosed herein are not limited to the illustrated groupings.

The method 700 may further include additional operations 800, shown in FIG. 8. The method 700 may include, at 802, generating the registration message comprising at least two addresses of the at least one neighbor node, the two addresses corresponding to addresses at a higher protocol layer and a lower protocol layer. For example, as indicated at 804, the at least two addresses may comprise a transport network layer (TNL) address and radio network layer (RNL) address of the at least one neighbor node. The method 700 may further include, at 806, generating the registration message selected from a standard X2-AP message, a modified standard X2-AP message, or a new X2-AP message. A "standard" X2-AP message means a message defined by an X2-AP published standard. Such a message may be modified to obtain a "modified standard" message. In an alternative, a new X2-AP message may be defined that is not in a published standard. The method 700 may further include, at 808, updating, by the X2-GW, a routing table, at least in part by including an association between the at least two addresses of the at least one neighbor node. For example, the at least two addresses may be stored in related fields of a record in a relational database or other relational data structure. This may be performed by an X2-GW node.

The method 700 may further include additional operations 900, shown in FIG. 9. The method 700 may include, at 902, initiating the discovering in response to at least one of detection of at least one new neighbor node, or an address parameter change at the at least one neighbor node. The method 700 may include, at 904, transmitting another registration message comprising at least one updated address in response to detecting the parameter change. The X2-GW may use such messages with updated address information to maintain a routing table in current condition.

Figure 10:
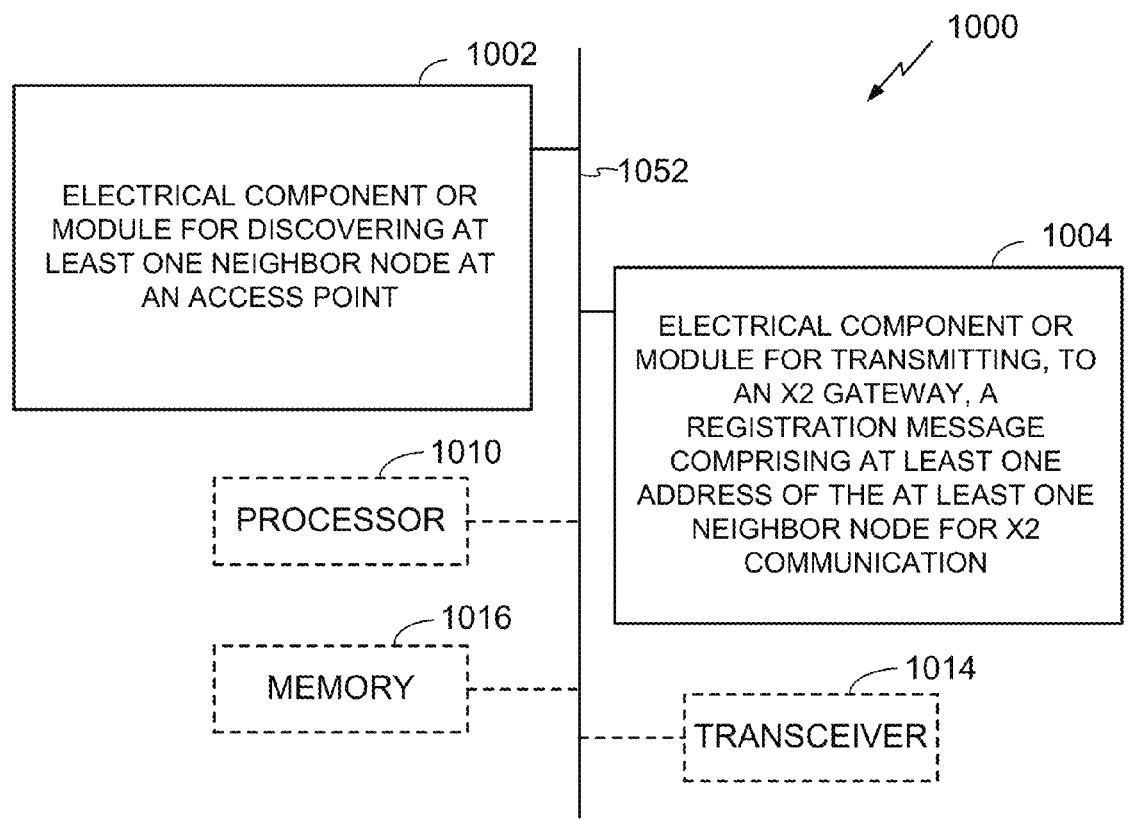
FIG. 10 shows an embodiment of an apparatus for X2 set up and routing at an X2-GW, in accordance with the methodology of FIG. 7.

FIG. 10 shows an embodiment of an apparatus for X2 set up and routing at an X2-GW, in accordance with the methodology of FIG. 7. With reference to FIG. 10, there is provided an exemplary apparatus 1000 that may be configured as a network entity (e.g., an HeNB, a femtocell, a picocell, or other small cell, or a macrocell) in a wireless network, or as a processor or similar device/component for use within the network entity. The apparatus 1000 may include functional blocks that can represent functions implemented by a processor, software, or combination thereof (e.g., firmware). For example, apparatus 1000 may include an electrical component or module 1002 for discovering at least one neighbor node at an access point. The component or module 1002 may be, or may include, a means for discovering at least one neighbor node at an access point. Said means may include a processor coupled to a transceiver and to a memory, the memory holding executable instructions for an algorithm. The algorithm may include, for example, detecting radio signals, determining a cell identifier associated with detected signals, transmitting a request to a neighbor cell identified by the cell identifier, and receiving a response to the request. The response may include, for example, one or both of an RNL address or a TNL address of the neighbor cell. The request may include a signal requesting transmission of one or both of an RNL address or a TNL address of the neighbor cell.

The apparatus 1000 may include an electrical component or module 1004 for transmitting, to an X2-GW, a registration message comprising at least one address of the at least one neighbor node for X2 communication. The component or module 1002 may be, or may include, a means for transmitting, to an X2-GW, a registration message comprising at least one address of the at least one neighbor node for X2 communication. Said means may include a processor coupled to a transceiver and to a memory, the memory holding executable instructions for an algorithm. The algorithm may include, for example, formatting a message including the at least one address, encoding the message, and transmitting the encoded message to a designated X2-GW. The at least one address may include one or both of an RNL address or a TNL address of a neighbor cell. By this means, the access point may provide the X2-GW with both of an RNL address or a TNL address for each neighbor cell that the access point has discovered. In related aspects, the apparatus 1000 may optionally include a processor component 1010 having at least one processor, in the case of the apparatus 1000 configured as a network entity (e.g., a femtocell, a macrocell, a picocell, or the like), rather than as a processor. The processor 1010, in such case, may be in operative communication with the components 1002-1004 via a bus 1052 or similar communication coupling. The processor 1010 may effect initiation and scheduling of the processes or functions performed by electrical components 1002-1004. In further related aspects, the apparatus 1000 may include a radio transceiver component 1014. A stand alone receiver and/or stand alone transmitter may be used in lieu of or in conjunction with the transceiver 1014. When the apparatus 1000 is a network entity, the apparatus 1000 may also include a network interface (not shown) for connecting to one or more core network entities. The apparatus 1000 may optionally include a component for storing information, such as, for example, a memory device/component 1016. The computer readable medium or the memory component 1056 may be operatively coupled to the other components of the apparatus 1000 via the bus 1052 or the like. The memory component 1016 may be adapted to store computer readable instructions and data for effecting the processes and behavior of the components 1002-1004, and subcomponents thereof, or the processor 1010, or the methods disclosed herein. The memory component 1016 may retain instructions for executing functions associated with the components 1002-1004. While shown as being external to the memory 1016, it is to be understood that the components 1002-1004 can exist within the memory 1016. It is further noted that the components in FIG. 10 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually encode data magnetically, while discs encode data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for X2 communication set up, the method comprising:
   detecting, by a node, a trigger indicating a change in a parameter of the node;
   discovering, by the node and based at least in part on detecting trigger, at least one neighbor node of the node; and
   transmitting, to an X2 gateway (X2-GW), a registration message comprising at least two addresses of the at least one neighbor node for X2 communication, wherein the registration message is used by the X2-GW to learn the at least two addresses and is used to allow the X2 communication between the node and the at least one neighbor node without requiring the at least one neighbor node to perform registration with the X2-GW.

2. The method of claim 1, further comprising:
   receiving an acknowledgement message from the X2-GW for the registration message.

3. The method of claim 1, wherein the at least two addresses correspond to an address at a higher protocol layer and an address at a lower protocol layer.

4. The method of claim 1, wherein the at least two addresses comprise a transport network layer (TNL) address and a radio network layer (RNL) address of the at least one neighbor node.

5. The method of claim 1, further comprising:
   generating the registration message selected from a standard X2-AP message, a modified standard X2-AP message, or a new X2-AP message.

6. The method of claim 1, further comprising:
   updating, by the X2-GW, a routing table at least in part by including an association between the at least two addresses.

7. The method of claim 1, further comprising:
   transmitting another registration message comprising at least one updated address.

8. The method of claim 1, further comprising:
   performing an X2 setup to establish an X2 interface through the X2 gateway, and initiating communication with the at least one neighbor node via the X2 interface.

9. An apparatus comprising:
   at least one processor configured to:
      detect a trigger indicating a change in a parameter of the apparatus;
      discover, based at least in part on detecting the trigger, at least one neighbor node of the apparatus; and
      transmit, to an X2 gateway (X2-GW), a registration message comprising at least two addresses of the at least one neighbor node for X2 communication, wherein the registration message is used by the X2-GW to learn the at least two addresses and is used to allow the X2 communication between the apparatus and the at least one neighbor node without requiring the at least one neighbor node to perform registration with the X2-GW; and
   a memory coupled to the at least one processor for storing data.

10. The apparatus of claim 9, wherein the at least one processor is further configured to:
    receive an acknowledgement message from the X2-GW for the registration message.

11. The apparatus of claim 9, wherein the at least two addresses correspond to an address at a higher protocol layer and an address at a lower protocol layer.

12. The apparatus of claim 9, wherein the at least two addresses comprise a transport network layer (TNL) address and a radio network layer (RNL) address of the at least one neighbor node.

13. The apparatus of claim 9, wherein the at least one processor is further configured to:
    generate the registration message selected from a standard X2-AP message, a modified standard X2-AP message, or a new X2-AP message.

14. The apparatus of claim 9, wherein the at least one processor is further configured to:
    update a routing table, for the X2-GW, at least in part by including an association between the at least two addresses.

15. The apparatus of claim 9, wherein the at least one processor is further configured to:
    transmit another registration message comprising at least one updated address.

16. The apparatus of claim 9, wherein the at least one processor is further configured to:
    perform an X2 setup to establish an X2 interface through the X2 gateway, and initiate communication with the at least one neighbor node via the X2 interface.

17. An apparatus comprising:
    means for detecting a trigger indicating a change in a parameter of the apparatus;
    means for discovering, based at least in part on detecting the trigger, at least one neighbor node of the apparatus; and
    means for transmitting, to an X2 gateway (X2-GW), a registration message comprising at least two addresses of the at least one neighbor node for X2 communication, wherein the registration message is used by the X2-GW to learn the at least two addresses and is used to allow the X2 communication between the apparatus and the at least one neighbor node without requiring the at least one neighbor node to perform registration with the X2-GW.

18. The apparatus of claim 17, further comprising:
means for receiving an acknowledgement message from the X2-GW for the registration message.

19. The apparatus of claim 17, wherein the at least two addresses correspond to an address at a higher protocol layer and an address at a lower protocol layer.

20. The apparatus of claim 17, wherein the at least two addresses comprise a transport network layer (TNL) address and a radio network layer (RNL) address of the at least one neighbor node.

21. The apparatus of claim 17, further comprising:
means for generating the registration message selected from a standard X2-AP message, a modified standard X2-AP message, or a new X2-AP message.

22. The apparatus of claim 17, further comprising:
means for updating a routing table, for the X2-GW, at least in part by including an association between the at least two addresses.

23. The apparatus of claim 17, further comprising:
means for transmitting another registration message comprising at least one updated address.

24. The apparatus of claim 17, further comprising:
means for performing an X2 setup to establish an X2 interface through the X2 gateway, and
means for initiating communication with the at least one neighbor node via the X2 interface.

25. A non-transitory computer-readable medium storing instructions, the instructions comprising:
one or more instructions which, when executed by a processor of a node, cause the processor to:
detect a trigger indicating a change in a parameter of the node;
discover, based at least in part on detecting the trigger, at least one neighbor node of the node; and
transmit, to an X2 gateway (X2-GW), a registration message comprising at least two addresses of the at least one neighbor node for X2 communication, wherein the registration message is used by the X2-GW to learn the at least two addresses and is used to allow the X2 communication between the apparatus and the at least one neighbor node without requiring the at least one neighbor node to perform registration with the X2-GW.

26. The non-transitory computer-readable medium of claim 25, wherein the instructions further comprise:
one or more instructions to receive an acknowledgement message from the X2-GW for the registration message.

27. The non-transitory computer-readable medium of claim 25, wherein the at least two addresses correspond to an address at a higher protocol layer and an address at a lower protocol layer.

28. The non-transitory computer-readable medium of claim 25, wherein the at least two addresses comprise a transport network layer (TNL) address and radio network layer (RNL) address of the at least one neighbor node.

29. The non-transitory computer-readable medium of claim 25, wherein the instructions further comprise:
one or more instructions to transmit another registration message comprising at least one updated address based on detecting another parameter change.

30. The non-transitory computer-readable medium of claim 25, wherein the instructions further comprise:
one or more instructions to perform an X2 setup to establish an X2 interface through the X2 gateway, and
one or more instructions to initiate communication with the at least one neighbor node via the X2 interface.

* * * * *